(12) United States Patent
Jing et al.

(10) Patent No.: US 6,911,512 B2
(45) Date of Patent: Jun. 28, 2005

(54) POWDER COATING FLUOROPOLYMER COMPOSITIONS WITH AROMATIC MATERIALS

(75) Inventors: Naiyong Jing, Woodbury, MN (US); Lisa P. Chen, St. Paul, MN (US); Jeffrey T. Anderson, Lake Elmo, MN (US); Thomas J. Blong, Woodbury, MN (US); Justin A. Riddle, Bloomington, IN (US); Blake E. Chandler, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/683,078

(22) Filed: Oct. 10, 2003

(65) Prior Publication Data

US 2005/0080210 A1 Apr. 14, 2005

(51) Int. Cl.$^7$ .................................................. C08F 14/18
(52) U.S. Cl. ........................ 526/242; 526/249; 525/368; 525/369; 525/372
(58) Field of Search ................................. 526/242, 249; 525/368, 369

(56) References Cited

U.S. PATENT DOCUMENTS

| | | | |
|---|---|---|---|
| 2,979,418 A | | 4/1961 | Dipner |
| 4,098,756 A | * | 7/1978 | Miller et al. ................. 525/120 |
| 4,237,177 A | | 12/1980 | Slama et al. |
| 4,297,447 A | | 10/1981 | Yasuda |
| 4,379,885 A | | 4/1983 | Miller et al. |
| 4,544,708 A | | 10/1985 | Moggi et al. |
| 4,713,418 A | | 12/1987 | Logothetis et al. |
| 4,868,234 A | | 9/1989 | Tabb et al. |
| 4,882,390 A | | 11/1989 | Kolb |
| 4,925,892 A | | 5/1990 | Tabb et al. |
| 5,232,746 A | | 8/1993 | Bladel et al. |
| 5,262,490 A | * | 11/1993 | Kolb et al. ................. 525/343 |
| 5,268,405 A | | 12/1993 | Ojakaar et al. |
| 5,284,611 A | | 2/1994 | Grootaert et al. |
| 5,371,143 A | | 12/1994 | Novak et al. |
| 5,654,375 A | * | 8/1997 | Jing et al. ................. 525/326.3 |
| 5,719,245 A | | 2/1998 | Yamamoto et al. |
| 5,859,153 A | | 1/1999 | Kirk et al. |
| 6,025,017 A | * | 2/2000 | Roth ........................... 427/146 |
| RE36,794 E | * | 7/2000 | Grootaert ..................... 526/194 |
| 6,117,508 A | | 9/2000 | Parsonage et al. |
| 6,153,303 A | | 11/2000 | Namura et al. |
| 6,232,372 B1 | | 5/2001 | Brothers et al. |
| 6,447,916 B1 | | 9/2002 | Van Gool |
| 6,455,636 B2 | * | 9/2002 | Sanada ........................ 525/132 |
| 6,467,509 B1 | | 10/2002 | Iio et al. |
| 6,489,420 B1 | | 12/2002 | Duchesne et al. |
| 6,551,708 B2 | | 4/2003 | Tsuda et al. |
| 2001/0034414 A1 | | 10/2001 | Effenberger et al. |
| 2003/0118765 A1 | | 6/2003 | Govaerts et al. |

FOREIGN PATENT DOCUMENTS

| | | |
|---|---|---|
| AU | 619 311 | 1/1990 |
| CA | 1 090 028 | 11/1980 |
| DE | 35 26 056 A | 1/1987 |
| EP | 0 084 771 A2 | 8/1983 |
| EP | 0 168 020 A2 | 1/1986 |
| EP | 0 320 894 A2 | 6/1989 |
| EP | 0 574 319 A1 | 12/1993 |
| EP | 1 167 442 A1 | 1/2002 |
| EP | 1 167 443 A1 | 1/2002 |
| GB | 1 521 095 | 8/1978 |
| JP | 2072942 A | 3/1990 |
| JP | HEI 5-86987 | 12/1993 |
| SU | 462 854 A | 9/1975 |
| SU | 545 656 A | 3/1977 |
| WO | WO 03/093334 A1 | 11/2003 |
| WO | WO 03/093335 A2 | 11/2003 |

* cited by examiner

Primary Examiner—David W. Wu
Assistant Examiner—Henry Hu
(74) Attorney, Agent, or Firm—Dean M. Harts

(57) ABSTRACT

Provided is a composition comprising an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring wherein at least one hydroxyl group is a phenolate salt, or a combination thereof, and a salt former compound capable of forming a salt with the aromatic material, a fluoropolymer, and optionally a phase transfer catalyst. Also provided are articles comprising powder-coated fluoropolymers with aromatic compounds, and methods for making the compositions and articles.

38 Claims, No Drawings

POWDER COATING FLUOROPOLYMER COMPOSITIONS WITH AROMATIC MATERIALS

TECHNICAL FIELD

This invention relates to a fluoropolymer with a salt former compound and an aromatic material, such as a compound or resin, suitable for powder coating applications. This invention also relates to articles involving the above-described materials as well as such compositions in layers.

BACKGROUND

Fluoropolymers are known in industry to provide chemical resistance, low moisture absorption and low surface energy surfaces. Fluoropolymers are inert to nearly all chemicals and solvents, even at elevated temperatures and pressures. Fluoropolymers also can function as a barrier as few chemicals are absorbed into or swell fluoropolymers and they possess relatively low gas and moisture permeability. Fluoroplastics are semicrystalline fluoropolymers having a distinct melting point.

Stainless steels are used widely for their corrosion resistance. Although they have extremely good general corrosion resistance, they are nevertheless susceptible to pitting corrosion. Examining a stainless steel surface with a microscope typically shows small pits resulting from intense local corrosion. This local dissolution of an oxide-covered metal in specific aggressive environments is one of the most common and catastrophic causes of failure of metallic structures. Protective coatings, such as a fluoropolymer coating, on stainless steel still may be desirable or even necessary for corrosion resistance in various applications.

While fluoropolymers have been used to coat metallic substrates for non-stick properties (e.g., cookware) and also for corrosion protection (e.g., chemical tanks, exhaust ducts), their non-stick characteristics lead to challenges when bonding fluoropolymers to substrates. Typically the bonding of fluoropolymers to metallic substrates initially involves the use of chemical etching or high pressure grit blasting to give a rough profile to the substrate. A primer is then applied. Known thermally stable binders, such as polyamideimide, polyethersulfone, polyphenylene sulfide, polyetheretherketone, and the like are not known to chemically interact with fluoropolymers, which limits the use of these materials as primers. The primers may be a powder, or more commonly are applied from solvent or via an aqueous solution. The article usually is baked at the necessary temperatures to attain bonding and drive off solvents or liquid carriers. A fluoropolymer topcoat typically is then applied and baked to fuse the fluoropolymer into a protective or decorative coating.

SUMMARY

The present inventors have discovered a useful family of materials for fluoropolymer compositions and multilayer articles involving fluoropolymer compositions.

Briefly, the present invention provides a composition comprising (a) an aromatic material such as a compound or resin selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, (b) a salt former compound capable of forming a salt with the aromatic material, (c) a perfluoroelastomer substantially free of interpolymerized units of vinylidene fluoride or a fluoroplastic, and optionally (d) a phase transfer catalyst.

In another aspect, the present invention provides a composition comprising a reaction product of (a) an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, (b) a salt former compound capable of forming a salt with the aromatic material, and (c) a fluoroplastic or a perfluoroelastomer, wherein said perfluoroelastomer is substantially free of interpolymerized units of vinylidene fluoride, and optionally including (d) a phase transfer catalyst.

In another aspect, the present invention provides an article comprising a substrate comprising a substantially organic material essentially free a phenolate or thiolate salt, or a substantially inorganic material, a first layer comprising the reaction product of an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, along with a salt former compound capable of forming a salt with the aromatic material, a fluoropolymer selected from a perfluoroelastomer substantially free of interpolymerized units of vinylidene fluoride or a fluoroplastic, and optionally a phase transfer catalyst. In this embodiment, each of (i) the aromatic material and (ii) the salt former compound can be, independently, present at an interface between the substrate and the remainder of the first layer, present with the fluoropolymer, or both, and the first layer is bonded to the substrate.

In another aspect, the invention provides a method of providing a fluoropolymer-coated surface comprising (a) providing a substrate, optionally selected from a substantially inorganic material, applying to the substrate a composition of an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, along with a salt former compound capable of forming a salt with the aromatic material, a perfluoroelastomer substantially free of interpolymerized units of vinylidene fluoride or a fluoroplastic, and optionally a phase transfer catalyst, wherein each of (i) the aromatic material and (ii) the salt former compound is, independently, present at an interface between the substrate and the remainder of the first layer, present with the fluoroplastic, or both, and (b) bonding the composition to the substrate.

It is an advantage of the present invention in one aspect to provide compositions for bonding fluoropolymers to substrates such as metals. Other features and advantages of the invention will be apparent from the following detailed description of the invention and the claims. The above summary is not intended to describe each illustrated embodiment or every implementation of the present disclosure. The description that follows more particularly describes and exemplifies certain preferred embodiments using the principles disclosed herein.

DETAILED DESCRIPTION PRESENTLY PREFERRED EMBODIMENTS

All numbers herein are assumed to be modified by the term "about." The recitation of numerical ranges by endpoints includes all numbers subsumed within that range (e.g., 1 to 5 includes 1, 1.5, 2, 2.75, 3, 3.80, 4, and 5).

The present invention provides a composition comprising (a) an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, (b) a salt former compound capable of forming a salt with the aromatic material, (c) a perfluoroelastomer substantially free of interpolymerized units of vinylidene fluoride or a fluoroplastic, and optionally (d) a phase transfer catalyst. Unless otherwise specified, as used herein a "resin" is a polymer or oligomer whereas a "compound" is not a polymer or oligomer, for example a compound with too few or no repeating units typical of a polymer or oligomer.

The polyhydroxy aromatic compounds useful in the present invention have at least one aromatic ring, which ring has at least one hydroxyl group attached directly to it and at least one of the hydroxyl group is capable of forming a phenolate salt. In one aspect of the present invention, the polyhydroxy aromatic compounds comprise at least one aromatic ring having a plurality of hydroxyl groups attached directly to the aromatic ring. Examples of suitable polyhydroxy aromatic compounds include resorcinol, pyrogallol, phloroglucinol, catechol, 1,5-dihydroxynaphthalene and 4,4'-dihydroxybiphenyl, hydroquinone, or a combination thereof.

Also useful in the present invention are polythiol aromatic compounds, and hydroxythiophenol compounds. An example of a suitable polythiol aromatic compound is benzene-1,4-dithiol. An example of a suitable hydroxythiophenol compound is 4-mercaptophenol. A salt of such a compound can be formed in situ, such as on the substrate or during or after combining with (such as mixing into) a fluoropolymer, or formed before combining with the substrate and/or fluoropolymer materials.

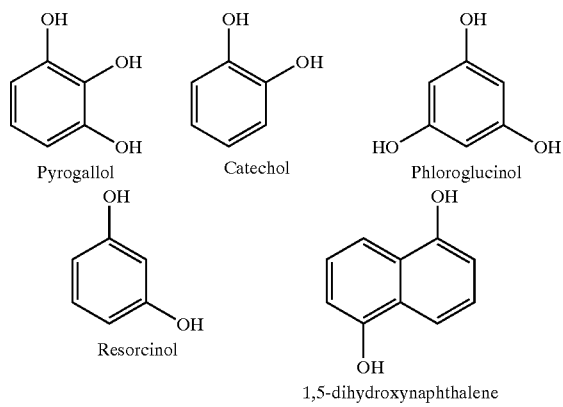

Pyrogallol  Catechol  Phloroglucinol

Resorcinol 1,5-dihydroxynaphthalene

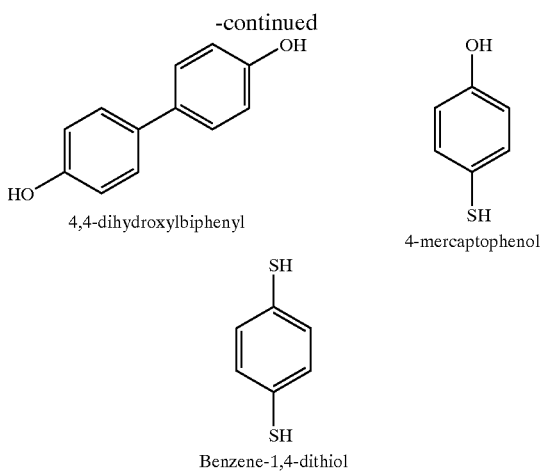

4,4-dihydroxylbiphenyl 4-mercaptophenol

Benzene-1,4-dithiol

In another aspect, the invention employs a resin. For example, useful are polyhydroxy aromatic resins that comprise at least one aromatic ring having at least one hydroxyl group attached directly to the aromatic ring, and in certain embodiments at least one aromatic ring has at least two hydroxyl groups attached directly to the aromatic ring. Also useful are polythiol aromatic resins, polythiol aromatic resins, hydroxythiophenol resins, phenolic resins available as Durite™ from Borden Chemical Co., catechol novolak resin, and/or catechol cresol novolak resin, along with combinations of these materials.

The present invention demonstrates that Catechol Novolak (CN) or Catechol Cresol Novolak (CCN) resins lead to excellent adhesion when used as either powder primers or liquid primers between a fluoropolymer or a fluoropolymer blend and a substantially inorganic substrate, e.g., a metal surface. In one aspect, a boiling water test was used to show that the interlayer adhesion remained strong after an exposure of several hours. Surprisingly, CN or CCN resins have also aided adherence of perfluoropolymers to metal surfaces with the present invention. Examples of such perfluoropolymers included FEP (a copolymer of tetrafluoroethylene and hexafluoropropylene) and PFA (a copolymer of tetrafluoroethylene and perfluorovinylether).

One useful resin is a blend of CN and an adjuvant. This material can be made via the process described below, using catechol novolak (also prepared via the process described below), along with DEH 87 (a hydroxyl-terminated phenolic hardener available from Dow Chemical Co.). The resulting blend typically is a dark colored solid with 20 wt % catechol novolak and 80 wt % DEH 87. While various aspects of the invention use an epoxy derivative, such materials are substantially free of oxiranes, such that they have an epoxy value approaching zero or even zero. Thus, these materials typically are not tacky and typically are unsuitable for use as adhesives.

The salt former compound employed in the invention includes those known in the art. For example, useful salt former compounds include organic and inorganic compounds capable of forming a salt with the aromatic compound or resin. More specifically, useful salt former compounds include oxides and/or hydroxides of magnesium, calcium, and other metals, as well as amines. In one aspect of the present invention, the salt former compound has a pKb sufficiently low to be capable of forming a phenolate salt or thiolate salt with the aromatic compound or resin. In one aspect of the present invention, the salt former compound has a pKb below about 8, below about 6, below 4, below 2, around 0, or even below 0.6

The compounds, resins, and/or salt former compounds described above are generally used in small amounts relative to the weight of the fluoropolymer. For example, the amount of such material is generally below about 25 weight percent (wt %), more preferably below about 20 wt % or even below about 15 wt % of the overall composition (aromatic compound or resin, salt former compound, plus any catalyst plus fluoropolymer, but not including the substrate when used). In another aspect, the compounds, resins, and/or salt material is generally above about 0.1 wt %, more preferably above about 0.5 wt %, or even above about 1 wt % of the overall composition.

Suitable fluoropolymers for the present invention include perfluoroelastomers and fluoroplastics such as those having interpolymerized units of one or more fluorinated or perfluorinated comonomers such as tetrafluoroethylene (TFE), chlorotrifluoroethylene, hexafluoropropylene (HFP), vinylidene fluoride (VDF), fluorovinylethers, perfluorovinylethers, as well as combinations of one or more of these along with one or more non-fluorinated comonomer such as ethylene or propylene or other lower olefins. In another aspect, polytetrafluoroethylene (PTFE) can be used in the invention, preferably in a blend with another fluoropolymer, and optionally as a fluoropolymer filler. More specifically, useful fluoropolymers include those commercially available under the designations THV (described as a copolymer of tetrafluoroethylene, hexafluoropropylene, and vinylidene fluoride), FEP (a copolymer of tetrafluoroethylene and hexafluoropropylene), PFA (a copolymer of tetrafluoroethylene and perfluorovinylether), HTE (a copolymer of tetrafluoroethylene, hexafluoropropylene, and ethylene), ETFE (a copolymer of tetrafluoroethylene and ethylene), ECTFE (a copolymer of chlorotrifluoroethylene and ethylene), PVF (polyvinyl fluoride), PVDF (polyvinylidene fluoride), as well as combinations thereof. Any of the aforementioned materials may further contain interpolymerized units of additional monomers, e.g., copolymers of TFE, HFP, VDF, ethylene, or a perfluorovinylether such as a perfluoroalkylvinylether (PAVE) and/or a perfluoroalkoxyvinylether (PAOVE). Combinations of two or more fluoropolymers also may be used. In some embodiments of the present invention, fluoroplastics such as THV and/or ETFE and/or HTE are preferred. The perfluoroelastomer useful in the present invention preferably is substantially free of interpolymerized units of vinylidene fluoride, even at low levels (below about 5 mole %, below about 1 mol%, or even lower) such as may be used for cure site monomers.

In addition, a phase transfer catalyst (PTC) can be used in the present invention. Such materials are known in the art, for example, triphenylbenzylphosphonium chloride, tributylalkylphosphonium chloride, tetraphenylphosphonium chloride, tetrabutylphosphonium bromide, tributylbenzylammonium chloride, tetrabutylammonium bromide, and triarylsulfonium chloride.

The PTC also is generally used in small amounts relative to the weight of the fluoropolymer. For example, the amount of PTC is generally below about 10 weight percent (wt %), more preferably below about 5 wt % or even below about 2 wt % of the overall composition (e.g., salt former compound, resin and/or aromatic compound plus fluoropolymer, but not including the substrate when used). In another aspect, the PTC is generally above about 0.1 wt %, more preferably above about 0.3 wt %, or even above about 0.5 wt % of the overall composition.

The invention may also include other additives incorporated into the composition. Other additives may include but are not limited to inert fillers, stabilizers, pigments, reinforcing agents, lubricants, flow additives, other polymers, and the like. Flow additives may be from the family of waxes. In one aspect, the present invention provides a primer wherein the salt former compound is combined with a wax, e.g., paraffin waxes, poly(oxyethylene glycol) available as Carbowax™ from Dow Chemical Co. In one aspect of the invention, such a wax (optionally together with one or more other components in the composition) can be coated on the surface of another component such as the fluoropolymer particles and/or the salt former compound.

Generally the aromatic resin used in the present invention has a melting temperature below about 150° C., more typically below about 140° C. In many aspects this melting temperature is much lower, such as below about 120° C. or even lower. In particular aspects, the invention uses a wax with a melting temperature below about 80° C. or an aromatic resin that is molten above about 40° C., more preferably molten above about 50° C. or even above about 55, 60 or 65° C. In one embodiment, the aromatic material or a material in which the aromatic material is dispersed has a melting temperature or softening point below the melting point or softening point of the fluoroplastic. This embodiment provides one of the ways to provide the aromatic material on the surface of fluoropolymer particles (such as powder or granules).

In another aspect, the present invention provides a composition comprising a reaction product of an aromatic material (such as described above) together with a salt former compound capable of forming a salt with the aromatic material, and a fluoropolymer selected from a fluoroplastic or a perfluoroelastomer, wherein said perfluoroelastomer is substantially free of interpolymerized units of vinylidene fluoride, and optionally including (d) a phase transfer catalyst. This catalyst can be present in the reaction product, for example as a compound, as an intermediate, and as a reaction product.

In another aspect, the invention provides a method of providing a fluoropolymer for powder-coating comprising providing a composition as described above, wherein the fluoroplastic or perfluoroelastomer is provided in granular or powder form, heating the composition to a temperature above the melting point of the aromatic material or a material in which the aromatic material is included, or providing the composition as a solution, and mixing these components. In one embodiment, preferably when the fluoroplastic is used, heating and mixing can be carried out using a high shear mixer. When the perfluoroelastomer is used, a two-roll mill is a useful mixer. In another aspect, the aromatic material portion of the composition is provided in liquid form to the balance of the composition. For example, the aromatic material can be provided as a solution or as a molten material.

In another aspect, the invention provides a layered article. In this embodiment, the article can begin with a substrate comprising a substantially organic material essentially free of a fluoroelastomer, a substantially organic material essentially free of a phenolate or thiolate salt, or a substantially inorganic material. In addition, the article can include the reaction product of a composition described above. Substantially organic materials are those known in the art, such as polymeric materials. In one aspect of the invention, the substantially organic materials are essentially free of a fluoroelastomer, such that minimal amounts of a fluoroelastomer, if any, are included. Such minimal amounts typically are below about 10% of the weight of the composition (wt %), more preferably below about 5 wt %, below about 1 wt %, more preferably below about 0.5 wt %, or even zero. In one aspect of the invention, the substantially organic materials are essentially free of a phenolate or thiolate salt, such that minimal amounts of such a salt, if any, are included. Such minimal amounts typically are below about 5% of the weight of the composition (wt %), more preferably below about 2 wt %, below about 1 wt %, more preferably below about 0.5 wt %, below about 0.1 wt %, or even zero. Useful substantially organic substrates include fluoropolymers and nylon.

The substantially inorganic substrate can be, for example, glass, ceramic, metal, iron, stainless steel, steel, aluminum, copper, nickel, and alloys and combinations thereof In certain aspects of the present invention, the substrate preferably is selected from metal substrates.

A first layer is bonded to the substrate. This first layer after the substrate in the multilayer article comprises a composition of (i) an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, (ii) a salt former compound capable of forming a salt with the aromatic material, (iii) a fluoropolymer selected from a perfluoroelastomer substantially free of interpolymerized units of vinylidene fluoride or a fluoroplastic, and optionally (d) a phase transfer catalyst. The useful materials and amounts are described above.

In this embodiment, each of (i) the aromatic compound or resin and (ii) the salt former compound is, independently, present at an interface between the substrate and the remainder of the first layer, present with the fluoropolymer, or both. For example, the aromatic compound or resin can be blended or combined with the salt former compound and this combination can be applied to the substrate before the fluoropolymer is applied. For another example, the fluoropolymer can be blended with the salt former compound and this combination can be applied to a substrate having the aromatic material thereon. In yet another aspect, the aromatic compound or resin, optionally together with a salt former compound and/or other components, can be coated on the surface of the fluoropolymer. Such a coating preferably is provided by mixing components at a temperature below the melting range of the fluoropolymer and above the melting range of at least one of the other components, such as the aromatic material. Advantages of the various combinations will be apparent to the skilled person.

Additional layers may be used. In such an embodiment, the first layer preferably adheres very well to the substrate while the subsequent layers each adheres well to each immediately adjacent layer. Subsequent layers may include, for example, fluoropolymers such as fluoroplastic homopolymers, fluoroplastic copolymers, fluoroelastomers, perfluoroelastomers, polytetrafluoroethylene, and combinations thereof. When an elastomer is selected, a suitable curative preferably is used in the layer having the elastomer.

After a second layer comprising a fluoropolymer is adjacently adhered to the first layer, optional further layers may be used, such as a third layer comprising a fluoropolymer adjacently adhered to the second layer.

The first layer preferably provides a continuous coating on the substrate, although in some aspects, this first layer and any subsequent layer(s) independently can be continuous or discontinuous.

Substrates useful in the present invention are not particularly limited. For example, suitable substrates include glass, polymer such as a fluoropolymer or nylon, ceramic, metal, iron, stainless steel, steel, aluminum, copper, nickel, and alloys and combinations thereof. The substrate shape also is not particularly limited. For example, the substrate can be the surface of a fiber, flake, particle, which may be organic, inorganic, or a combination thereof. More specific examples include metallic sheet in the form of ductwork such as useful in exhaust ducts for chemical or semiconductor operations.

The layered aspects of the invention provide acceptable bonding, as measured via peel strength testing described below, under various exposure conditions. For example, at room temperature (around 22–25° C.), the compositions of the invention bond to various substrates. In addition, the inventive compositions maintain desirable peel strengths after various exposure conditions of increasing severity and duration such as the boiling water exposure described below. For example, in several embodiments, the invention provides high or very high peel strength even after boiling water exposure for 1 hour, 5 hours, 15 hours, or even 24 hours. The desired peel strength depends upon the application. For example, room temperature bonding is sufficient for many uses. In another example, maintaining peel strength after exposure to boiling water for a duration of one or even several hours may be desired. In some embodiments, the invention provides peel strength in pounds per inch of at least about 4, 5, 10, 15, 20, 25 or even higher. These levels in Newtons per millimeter (N/mm) range from about 0.7, 0.9, 1.8, 2.6, 3.5, 4.3 or even higher. In other embodiments, the invention provides articles having such peel strength after boiling water exposure for 1, 5, 15, or even 24 hours.

In another aspect, the invention provides a method of providing a fluoropolymer-coated surface. This embodiment comprises providing a substrate, optionally selected from a metal, according to the substrates described above. Applied to or provided on the substrate is a composition of an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof, a salt former compound capable of forming a salt with the aromatic material, a fluoroplastic, and optionally (d) a phase transfer catalyst, and bonding the composition to the substrate. The useful components include those described above in the various embodiments.

The inventive composition may be applied via any known method. Such methods include, for example, coating as a liquid, applying as a powder, laminating, and combinations thereof. One such method is electrostatic powder coating, such as described below. In addition, fusing the fluoropolymer such as via heat fusing can bond the first layer and/or additional layer(s).

In an aspect of the present invention, the layers of the articles preferably have a thickness below about 2 mm, more preferably below about 1 mm, or even below about 0.5 mm, or even lower. The composition applied to the substrate in one embodiment is generally much thinner than a composition including a fluoropolymer. For example, the composition may be applied to cover less than all of the substrate, or an amount sufficient to coat a desired area of the surface (which may be less than the entire surface). A fluoropolymer layer in a multilayer article may be at least about 0.01 mm, at least about 0.02 mm, at least about 0.05 mm, or even thicker. In another aspect the fluoropolymer layer in a multilayer article may be below about 5 mm, below about 2 mm, or even below about 1.5 mm.

Various embodiments of the present invention are useful in chemical storage tanks, exhaust duct coatings, biomedical devices, electronic materials, cookware and bakeware, and architectural coatings, to name a few.

Objects and advantages of this invention are further illustrated by the following examples, but the particular materials and amounts thereof recited in these examples, as well as other conditions and details, should not be construed to unduly limit this invention.

EXAMPLES

In the descriptions below, percent means percent by weight unless otherwise described in context. Unless otherwise stated, materials were available from Aldrich Chemicals, Milwaukee, Wis.

Materials

TFE is tetrafluoroethylene; HFP is hexafluoropropylene; VDF is vinylidene fluoride; PPVE is perfluoropropylvinylether.

| | |
|---|---|
| A | THV ™ 220A, a copolymer of TFE, HFP, and VDF available from Dyneon LLC, Oakdale, MN. |
| B | THV ™ 514A, a copolymer of TFE, HFP, and VDF available from Dyneon. |
| C | A copolymer of 66% TFE, 20% HFP, 10% VDF, and 4% PPVE available from Dyneon made as per U.S. Pat. No. 6489420. |
| D | An agglomerate form of HTE-X 1510 copolymer of TFE, HFP, and Ethylene available from Dyneon. |
| E | PFA-6502A, a copolymer of TFE and PPVE available from Dyneon. |
| F | FEP-X 6315A, a copolymer of TFE and HFP available from Dyneon. |
| G | An agglomerate form of HTE-X 1705 copolymer of TFE, HFP, and Ethylene available from Dyneon. |
| H | A copolymer of 57.7 mole % (mol %) TFE, 3.9 mol % HFP, 37.2 mol % Ethylene, and 1.2 mol % PPVE was made according to WO 02088203, and had a melting point of 206° C. and MFI of 22 g/10 min. (265° C./5 kg). |
| J | A copolymer of 57.3 mole % (mol %) TFE, 4.6 mol % HFP, 36.9 mol % Ethylene, and 1.2 mol % PPVE was made according to WO 02088203, and had a melting point of 195° C. and MFI of 26 g/10 min. (265° C./5 kg). |
| ACN | Aqueous catechol novolak, made as described below. |
| ACN Blend | 20% CN and 80% DEH-87 (from Dow Chem., Midland, MI). |
| SF-1 | A blend of 88% ACN Blend mixed with 5% MgO, 5% Ca(OH)$_2$ and 2% tetraphenylphosphonium chloride. |
| CCN | Catechol Cresol Novolak (CCN), made according to U.S. Pat. No. 5859153. |
| SF-2 | A blend of 88% CCN mixed with 5% MgO, 5% Ca(OH)$_2$ and 2% tetraphenylphosphonium chloride. |
| SF-3 | A blend of 1 part by weight (pbw) aromatic compound (as specified in the Table below) with 1.0 pbw MgO, 1.0 pbw Ca(OH)$_2$ and 0.5 pbw tetraphenylphosphonium chloride. |
| SF-4 | A blend of 1 part by weight (pbw) phloroglucinol with 1.0 pbw MgO, 1.0 pbw Ca(OH)$_2$. |
| Durite | Durite SD 7280, a phenolic novolak resin available from Borden Chemical Co. |

Synthesis of Aqueous Catechol Novolak (ACN)

Into a one-liter three-necked, round-bottom flask equipped with a paddle stirrer, thermometer, water-cooled condenser and heating mantle were placed 440.4 g of catechol (4.0 moles) and 162 g of 37% aqueous formaldehyde (2.0 moles). 400 milliters of deionized water were added and stirring began. The mixture was heated to 50° C., 75° C., 85° C. and finally reflux over 15-minute intervals. Reflux was continued for 2 h total, after which the solution was cooled to about 60° C. Four grams (0.044 moles) of oxalic acid (catalyst) are added and the temperature was raised to reflux over a 30-minute period. Reflux was continued, totaling an additional 2 h. The pressure was gradually lowered to less than 1 mm Hg vacuum and the temperature of the mixture allowed to rise. The distillation was stopped when the solids content in water was 80%. The product was analyzed by gel permeation chromatography and determined to have a number average molecular weight of 365 and a weight average molecular weight of 855.

Preparation of ACN Blend

To an aluminum pan was added 80 g of DEH 87 available from Dow Chemical Co. and 25 g of Aqueous Catechol Novalak (above). According to the Material Safety Data Sheet, DEH 87 is a mixture of 10–16% Bisphenol A and 84–90% reaction product of epoxy resin/bisphenol A. This mixture was placed on a hot plate at 240° C. for 4 h with occasional mixing, to remove the water. The contents were then allowed to cool and broken into small pieces. The resulting blend was a dark brown solid with 20 wt % catechol novolak and 80 wt % DEH 87.

Test Methods

A Water Boiling exposure was conducted by immersing the prepared fluoropolymer composition-coated samples into boiling water for the chosen period of time. Subsequently the tested samples were removed from the boiling water and allowed to cool to room temperature prior to peel testing.

Peel strengths of laminated samples were determined following the test procedures described in ASTM D-1876 entitled "Standard Test Method for Peel Resistance of Adhesives," more commonly known as the "T-peel" test. Peel data was generated using an Instron™ Model 1125 Tester (available from Instron Corp., Canton, Mass.) equipped with a Sintech Tester 20 (available from MTS Systems Corp., Eden Prairie, Minn.). The Instron tester was operated at a cross-head speed of 4 in/min (10 cm/min). Peel strength was calculated as the average load measured during the peel test and is reported in lb/inch width (N/mm) as an average of at least two samples.

Examples 1–100

Stainless steel 400-series coupons (from Q-Panel Lab Products, Cleveland, Ohio) were washed with isopropanol and dried before use. CCN (Catechol Cresol Novolak) and ACN Blend solids were ground with a mortar and pestle prior to mixing with fluoropolymer. Fluoropolymer and the other components described in the Tables below were prepared by placing powdered fluoropolymers in desired ratios into jars with the other materials. Subsequently the jars were placed on a twin-roller mixer and rolled for about 2 h. Onto the stainless steel coupons was applied the first material (as a powder) described in the Table. The metal coupon with the powder was placed between heated metal platens at the desired temperature for 5 minutes (min.) until the fluoropolymer was molten. Then a piece of polytetrafluoroethylene (PTFE)-coated fiber sheet was placed on the top of the molten fluoropolymer, the sample was hot-pressed for 5 min at 300° C., and a slight force was applied to maintain good surface contact. Subsequently onto the coated first layer was applied a desired fluoropolymer powder or fluoropolymer powder mixture, then the second layer was placed between heated metal platens at the desired temperature for 2.5 min and thereafter a piece of PTFE-coated fiber sheet was placed on the top of the molten fluoropolymer, the sample was subjected to hot-pressing for 2.5 min at the desired temperature, and a slight force was applied to maintain good surface contact for later peel testing. It was immediately transferred to a cold press. After cooling to room temperature by cold pressing, a tab about 0.5 inches (1.25 cm) long was created by forcing a razor blade between the stainless steel and first layer. The resulting sample was subjected to T-peel measurement or further durability evaluations as reported in the Tables below.

Comparative Examples A–K

These examples were prepared as in Example 1 except that one or more components required by the invention (such as SF-3) were absent.

In the following Tables, Peel Strength is reported in N/mm, the time under Peel Strength is the hours of boiling water exposure before the peel test, and T is the platen temperature with an "R" used for the regular temperature of 300° C. and "L" used for the lower temperature of 250° C. Blanks indicate that the property was not measured. The weight ratio of the fluoropolymer to the other components in Layer 1 is given in parentheses. Under peel strength, "TL" means that the top layer peeled from Layer 1, otherwise Layer 1 was peeled from the substrate. Where a blend of fluoropolymers is used in Layer 1 or Layer 2, the weight ratio of the components is shown respectively in parentheses.

TABLE 1

Various Fluoropolymer Coatings

| Ex. | Layer 1 | | Layer 2 | Peel Strength 1 h | 5 h | 15 h | T |
|---|---|---|---|---|---|---|---|
| 1 | B/SF-1 | (90/10) | B | | >4.3 | >4.3 | L |
| 2 | B/SF-2 | (90/10) | B | | >4.3 | >4.3 | L |
| 3 | D/SF-1 | (90/10) | D | | >4.3 | >4.3 | L |
| 4 | D/SF-2 | (90/10) | D | | >4.3 | >4.3 | L |
| 5 | C/SF-1 | (95/5) | C | | >4.3 | 3.0 | L |
| 6 | B/SF-1 | (95/5) | B | | >4.3 | >4.3 | L |
| 7 | A/SF-1 | (95/5) | A | | >4.3 | >4.3 | L |
| 8 | D/SF-1 | (95/5) | D | | 1.1 | 0.7 | L |
| 9 | C/SF-1 | (98/2) | C | | 2.6 | 1.8 | L |
| 10 | C/SF-2 | (95/5) | C | | 4.0 | 4.0 | L |
| 11 | B/SF-2 | (95/5) | B | | >4.3 | >4.3 | L |
| 12 | A/SF-2 | (95/5) | A | | >4.3 | >4.3 | L |
| 13 | D/SF-2 | (95/5) | D | | 2.5 | 2.3 | L |
| 14 | C/SF-2 | (98/2) | C | | >4.3 | >4.3 | L |
| 15 | B/SF-2 | (95/5) | B | | | >4.3 | R |
| 16 | G/SF-2 | (90/10) | G | | >4.3 | >4.3 | L |
| 17 | E/SF-2 | (90/10) | E | | >4.3 | >1.1 TL | R |
| 18 | F/SF-2 | (90/10) | F | | >4.3 | >4.3 | R |
| 19 | E/SF-2 | (95/5) | E | | >4.3 | | R |
| 20 | F/SF-2 | (95/5) | F | | >4.3 | | R |
| 21 | E/SF-1 | (95/5) | E | | >4.3 | | R |
| 22 | F/SF-1 | (95/5) | F | | 3.9 | | R |
| 23 | E/SF-1 | (90/10) | E | | >4.3 | | R |
| 24 | F/SF-1 | (90/10) | F | | >4.3 | | R |
| 25 | G/BF6 SF-3 | (95/5) | G | >4.3 | | | R |
| 26 | G/BF6 SF-3 | (90/10) | G | >4.3 | 3.0 | | R |
| 27 | G/Pyrogallol SF-3 | (90/10) | G | | >4.3 | | R |
| A | G/Pyrogallol | (90/10) | G | | 0 | | R |
| 28 | G/Phloroglucinol SF-3 | (90/10) | G | | >4.3 | | R |
| B | G/Phloroglucinol | (90/10) | G | | 0 | | R |
| 29 | G/Resorcinol SF-3 | (90/10) | G | | >0.17 | | R |
| C | G/Resorcinol | (90/10) | G | | 0.2 | | R |
| 30 | G/Catechol SF-3 | (90/10) | G | | >0.17 | | R |
| D | G/Catechol | (90/10) | G | | 0.2 | | R |
| 31 | G/Resorcinol SF-3 | (95/5) | G | | >4.3 | | L |
| E | G/Resorcinol | (95/5) | G | 0 | | | L |
| 32 | G/4,4'-Biphenol SF-3 | (95/5) | G | | >4.3 | | L |
| F | G/4,4'-Biphenol | (95/5) | G | 0 | | | L |
| 33 | G/1,5-Dihydroxynaphthalene SF-3 | (95/5) | G | | >4.3 | | L |
| G | G/1,5-Dihydroxynaphthalene | (95/5) | G | 0 | | | L |
| 34 | B/BF6 SF-3 | (95/5) | B | 1.4 | 3.6 | | R |
| 35 | B/Resorcinol SF-3 | (95/5) | B | | >4.3 | | L |
| H | B/Resorcinol | (95/5) | B | 1.8 | | | L |
| 36 | B/Resorcinol SF-3 | (90/10) | B | | >4.0 | | R |
| 37 | B/4,4'-Biphenol SF-3 | (95/5) | B | | >4.3 | | L |
| J | B/4,4'-Biphenol | (95/5) | B | 0 | | | L |
| 38 | B/1,5-Dihydroxynaphthalene SF-3 | (95/5) | B | | 2.8 | | L |
| K | B/1,5-Dihydroxynaphthalene | (95/5) | B | 0 | | | L |
| 39 | B/Phloroglucinol SF-3 | (90/10) | B | | 3.5 | | R |
| 40 | E/BF6 SF-3 | (95/5) | E | | 3.3 | | R |
| 41 | E/BF6 SF-3 | (90/10) | E | | 4.4 | | R |
| 42 | E/Pyrogallol SF-3 | (90/10) | E | | >3.8 | | R |
| 43 | E/Phloroglucinol SF-3 | (95/5) | E | | >7.7 | | R |
| 44 | E/Phloroglucinol SF-3 | (90/10) | E | | >4.0 | | R |
| 45 | F/BF6 SF-3 | (95/5) | F | | 7.7 | | R |
| 46 | F/BF6 SF-3 | (90/10) | F | | 0.7 | | R |
| 47 | F/Pyrogallol SF-3 | (90/10) | F | | 4.0 | | R |
| 48 | F/Pyrogallol SF-3 | (95/5) | F | | 2.8 | | R |

TABLE 1-continued

Various Fluoropolymer Coatings

| Ex. | Layer 1 | | Layer 2 | Peel Strength 1 h | 5 h | 15 h | T |
|---|---|---|---|---|---|---|---|
| 49 | F/Phloroglucinol SF-3 | (95/5) | F | | 3.5 | | R |
| 50 | F/Resorcinol SF-3 | (90/10) | F | | >3.1 | | R |
| 51 | G/Phloroglucinol SF-4 | (90/10) | G | | 4.0 | | R |

TABLE 2

Additional Fluoropolymer Coatings

| Ex. | Layer 1 | | Layer 2 | Peel Strength 5 h | 15 h | T |
|---|---|---|---|---|---|---|
| 52 | A/E/SF-1 | (45/45/10) | E | >2.1 TL | | R |
| 53 | A/F/SF-1 | (45/45/10) | F | >2.6 TL | | R |
| 54 | A/E/SF-1 | (63/27/10) | E | 2.8 | | R |
| 55 | A/F/SF-1 | (63/27/10) | F | >2.1 TL | | R |
| 56 | A/F/SF-1 | (27/63/10) | F | 0.9 | | R |
| 57 | B/E/SF-1 | (45/45/10) | E | >2.1 TL | | R |
| 58 | B/F/SF-1 | (45/45/10) | F | >3.3 TL | | R |
| 59 | B/E/SF-1 | (63/27/10) | E | >2.6 TL | | R |
| 60 | B/F/SF-1 | (63/27/10) | F | >4.2 TL | | R |
| 61 | B/E/SF-1 | (27/63/10) | E | >2.2 TL | | R |
| 62 | B/F/SF-1 | (27/63/10) | F | 3.2 | | R |
| 63 | A/E/SF-2 | (45/45/10) | E | 0.9 | | R |
| 64 | A/F/SF-2 | (45/45/10) | F | >2.9 TL | | R |
| 65 | A/E/SF-2 | (63/27/10) | E | 2.3 | | R |
| 66 | A/E/SF-2 | (63/27/10) | F | >2.1 TL | | R |
| 67 | A/F/SF-2 | (27/63/10) | F | 2.6 | | R |
| 68 | B/E/SF-2 | (45/45/10) | B/E (1/1) | >4.3 | >1.9 | R |
| 69 | C/E/SF-2 | (45/45/10) | C/E (1/1) | >4.3 | >1.9 | R |
| 70 | G/E/SF-2 | (45/45/10) | G/E (1/1) | >4.0 | >1.8 | R |
| 71 | D/E/SF-2 | (45/45/10) | D/E (1/1) | >4.3 | >1.9 | R |
| 72 | B/E/SF-2 | (45/45/10) | E | >1.2 TL | >0.5 TL | R |
| 73 | C/E/SF-2 | (45/45/10) | E | >2.6 TL | | R |
| 74 | D/E/SF-2 | (45/45/10) | E | >4.3 | >1.9 | R |
| 75 | G/E/SF-2 | (45/45/10) | E | | >1.0 | R |
| 76 | B/F/SF-2 | (45/45/10) | F | >3.5 TL | | R |
| 77 | B/E/SF-2 | (63/27/10) | E | >1.7 TL | | R |
| 78 | B/F/SF-2 | (63/27/10) | F | >3.8 TL | | R |
| 79 | B/E/SF-2 | (27/63/10) | E | >2.6 TL | | R |
| 80 | B/F/SF-2 | (27/63/10) | F | 3.7 | | R |
| 81 | B/E/BF6 SF-3 | (45/45/10) | E | >2.6 TL | | R |
| 82 | B/E/BF6 SF-3 | (47.5/47.5/5) | E | >1.4 | | R |
| 83 | E/G/BF6 SF-3 | (47.5/47.5/5) | E | >2.4 | | R |
| 84 | B/E/Pyrogallol SF-3 | (45/45/10) | E | >1.7 | | R |
| 85 | B/E/Phloroglucinol SF-3 | (45/45/10) | E | >2.6 | | R |
| 86 | E/G/Resorcinol SF-3 | (47.5/47.5/5) | E | 2.6 | | R |
| 87 | B/E/Resorcinol SF-3 | (47.5/47.5/5) | E | >1.4 | | R |
| 88 | B/E/Resorcinol SF-3 | (45/45/10) | E | >2.4 | | R |

TABLE 2-continued

Additional Fluoropolymer Coatings

| Ex. | Layer 1 | | Layer 2 | Peel Strength 5 h | 15 h | T |
|---|---|---|---|---|---|---|
| 89 | B/E/Catechol SF-3 | (45/45/10) | E | >0.88 | | R |
| 90 | E/G/4,4-Biphenol SF-3 | (47.5/47.5/5) | E | 2.6 | | R |
| 91 | B/E/4,4-Biphenol SF-3 | (47.5/47.5/5) | E | >2.8 | | R |
| 92 | E/G/1,5-Dihydroxynaphthalene SF-3 | (47.5/47.5/5) | E | 2.6 | | R |
| 93 | B/E/1,5-Dihydroxynaphthalene SF-3 | (47.5/47.5/5) | E | >1.9 | | R |
| 94 | F/G/Resorcinol SF-3 | (47.5/47.5/5) | F | 2.3 | | R |
| 95 | B/F/Resorcinol SF-3 | (47.5/47.5/5) | F | >3.1 | | R |
| 96 | B/F/Catechol SF-3 | (45/45/10) | F | 0.7 | | R |
| 97 | F/G/4,4-Biphenol SF-3 | (47.5/47.5/5) | F | 2.5 | | R |
| 98 | B/F/4,4-Biphenol SF-3 | (47.5/47.5/5) | F | >3.3 | | R |
| 99 | F/G/1,5-Dihydroxynaphthalene SF-3 | (47.5/47.5/5) | F | 2.5 | | R |
| 100 | B/F/1,5-Dihydroxynaphthalene SF-3 | (47.5/47.5/5) | F | >1.7 | | R |

Example 101

Fluoropolymer H was pressed into discs and then fed into a hammer mill to obtain coarse powder. This powder then was milled in a Micro ACM 1 air classifier mill (Hosokawa Micron Corp., Osaka, Japan) to reach an average particle size of 52 μm.

For analysis of the particle size, a solution of the milled powder in hexanol was made and measured using a Malvern Mastersizer/E. The average particle size was measured to be 52 μm (hereinafter topcoat).

A second quantity of fluoropolymer powder was milled as described above to a finer average particle size measured to be 30 μm. A primer was made by combining 2500 g of this fluoropolymer powder with 48.8 g of a solution of 50 wt % benzyltriphenylphosphonium chloride in methanol in a high shear mixer (Merlin Henschel FM10) for 45 seconds at 3332 rpm, then adding 179.4 g of ACN and mixing for an additional 45 seconds at 3332 rpm. The mixture was discharged, poured into aluminum pans up to 1 in. (2.54 cm) depth and dried for 3 days at 80° C. in an air circulating oven. Meanwhile calcium hydroxide, magnesium oxide, and paraffin wax (available as IGI 1246 from International Group, Inc., Wayne, Pa.) were charged into the cleaned mixer in a 2:1:0.75 ratio totaling approximately 3 lb. (1361 g). The mixture was blended for 20 minutes at 3600 rpm, which conditions were sufficient to melt the paraffin wax and coat the particles of calcium hydroxide and magnesium oxide before discharging and cooling to room temperature. The dried and cooled fluoropolymer mixture was then placed into the mixer, and the calcium hydroxide/magnesium oxide/wax mixture was added and the combination was blended for 45 seconds at 3600 rpm. The final mixture was a free-flowing tan-colored powder.

Peel testing was carried out as described above with the following further details. Stainless steel panels (0.037 in. thickness (0.94 mm) from Q-Panel) were cut into 1×6 inch (2.54×15.2 cm) strips and degreased by immersing the steel strips in a heated alkaline solution (75 g of Oakite Cleaner 164 (available from Oakite Products, Berkeley Heights, N.J.) per liter of water maintained at 180° F. (80° C.)) for 10 minutes. The strips were then rinsed several times with distilled water, and dried in an air circulating oven at 160° F. (71° C.) for 10 minutes. Each strip was gritblasted to roughen the surface using 30 mesh alumina grit and 80 psi (552 kPa) air pressure. Any residual dust was removed with an air gun. The strips were clamped to a larger metal plate and brushed with a thin layer of PFA 6502N powder (available from Dyneon) over 2 inches (5 cm) of one end of each strip. This provided an area where the coating would not adhere to the metal to create a tab for the peel test. The strips were then electrostatically powder coated with the primer using a Nordson SureCoat, at 70 volts, 150 kPa airflow until no bare metal was visible. The strips were then baked in an air circulating oven at 525° F. (274° C.) for 15 minutes. Upon removal of the strips from the oven, the strips were immediately hotflocked with fluoropolymer topcoat at 70 volts, 150 kPa airflow and then placed back into the oven for an additional 15 minutes. A second layer of topcoat was applied and baked to achieve a coating thickness of 20 to 30 mils (508 to 762 μm). After the samples were cooled, the edges of each strip were scraped with a sharp blade to remove any coating that may have accumulated at the edges of the specimen. The following day, the samples were immersed in boiling water for 24 h. After removal from the water, the samples were allowed to cool to room temperature, and the peel strength was measured by testing the samples using an Instron equipped with a floating roller peel test fixture at a crosshead speed of 6 in/min (15 cm/min) and peeling to 3.75 inches (9.5 cm) extension per ASTM D3167. The peel strength was calculated over 0.5 to 3.5 inches (1.3 to 8.9 cm) extension using an integrated average and reported as an average of three samples. Example 101 had a peel strength of 23 lbs/in (4.0 N/mm).

Example 102

This example was similar to Example 101 except that Fluoropolymer J powder was used after milling to an average particle size of 50 μm. Forty grams of the fluoropolymer powder were blended with 0.3 g of a solution of 31 wt % tetraphenylphosphonium hydroxide in methanol in a Bel-Art Products mini-mill at full speed for 30 seconds. $Ca(OH)^2$ and MgO were added to the above mixture at 2.04 g and 1.02 g, respectively, and then the mixture was blended at full speed for an additional 30 seconds. Stainless steel strips were degreased and gritblasted as described in Example 101. Then 4 drops (approximately 0.2 g) of a 0.5 wt % aqueous solution of catechol novolak were applied to each strip and spread with a wooden stick. Each strip was allowed to air dry and then was electrostatically powder coated with the fluoropolymer mixture. The samples were baked at 475° F. (246° C.) for 15 minutes, coated with Fluoropolymer J powder, and rebaked at 475° F. (246° C.) for another 15 minutes. Peel strength testing was conducted as described in Example 101 after immersion in boiling water for 24 h. Example 102 had a peel strength of 22 lbs/in. (3.9 N/mm).

Example 103

The fluoropolymer powder of Example 101 was used, except that it was milled to an average particle size of 30 μm. Then 29.41 g fluoropolymer powder was blended in the mini-mill together with 0.29 g of tetrabutylphosphonium bromide for 30 seconds at full speed. ACN was then added at 2.11 g and blended for an additional 30 seconds at full speed. The mixture was then discharged and dried at 60° C. for 64 h. After cooling to room temperature, the mixture was combined with 2.90 g of the same $Ca(OH)_2$, MgO, and paraffin wax mixture used in Example 101 and blended in the mini-mill for 30 seconds at full speed. Peel strength testing was conducted as described in Example 101 after immersion in boiling water for 24 h. The peel strength was 36 lbs/in. (6.3 N/mm).

Example 104

The fluoropolymer powder of Example 101 was used except that it was milled to an average particle size of 30 μm. A primer was made by blending 34.12 g fluoropolymer powder in the mini-mill with 0.67 g of a solution of 50 wt % benzyltriphenylphosphonium chloride in methanol for 30 seconds at full speed. A solution of 50% phenolic resin (Durite) in MEK was added at 3.92 g and blended for an additional 30 seconds at full speed. The mixture was then discharged and dried at 60° C. overnight. After cooling, the mixture was combined with 1.84 g $Ca(OH)_2$ and 0.92 g MgO and blended in the mini-mill for 30 seconds at full speed. Peel strength testing was conducted as described in Example 101 except that the fluoropolymer used for the topcoat was the same as that in the primer. After immersion in boiling water for 24 h, Example 104 had a peel strength of 11 lbs/in. (1.9 N/mm).

Example 104

The fluoropolymer powder of Example 101 was used except that it was milled to an average particle size of 45 μm. Then 29.63 g fluoropolymer powder, 0.29 g of tetrabutylphosphonium bromide, 2.50 g ACN Blend ground previously with a mortar and pestle, and 2.93 g of the same $Ca(OH)_2$, MgO, and wax mixture used in Example 101 were blended in the mini-mill 30 seconds at full speed. Peel strength testing was conducted as described in Example 101 after immersion in boiling water for 24 h. Example 105 had a peel strength of 56 lbs/in. (9.8 N/mm).

Examples 106–110

2721.1 g of another batch of Fluoropolymer H powder similar to that used in Example 101 but with an MFI of 29 g/10 min. (265° C./5kg) and an average particle size of 45 μm was charged into the high shear mixer along with 26.7 g of tetrabutylphosphonium bromide and 156.2 g of ACN Blend. The mixture was blended for 11 minutes at 3600 rpm, during which the mix temperature reached about 110° C., a temperature sufficient to melt the ACN Blend (which was dark brown) and coat it onto fluoropolymer particles to produce a Premix, which was beige in color.

In Example 106, 45.57 g of the premix was mixed in the mini-mill with 2.12 g of DBU (1,8-diazabicyclo(5.4.0) undec-7-ene/phenol novolac resin salt available as UCAT SA-841 from San-Apro Ltd., Kyoto, Japan) at full speed for 30 seconds. Peel samples were prepared similarly to Example 101 except that the fluoropolymer used in Example 105 was used as the topcoat. Samples exhibited good initial bonding. After 24 h immersion in boiling water, the average peel strength was 2.1 lbs/in. (0.4 N/mm).

Example 107 was prepared similarly to Example 106 except that aluminum strips (alloy 2024 T3 of 0.063 inch thickness available from Q-Panel) were used for peel samples. Samples exhibited good initial bonding. After 24 h immersion in boiling water, the samples could not be peeled from the substrate.

Example 108 was prepared similarly to the Example 106 except 40.00 g of Example 105 was blended with 3.56 g of the calcium hydroxide/magnesium oxide/wax mixture used in Example 101. Peels samples were prepared similarly to Example 105 except that copper strips (3.2 mm thickness, available from McMaster Carr) were used. Samples exhibited good initial bonding. After 24 hrs immersion in boiling water, the samples had no bonding to the substrate.

Example 109 was prepared similarly to Example 108 except glass substrates were used, prepared by cleaning with dichloroethane. Samples exhibited good initial bonding. After 24 h immersion in boiling water, the samples exhibited no bonding to the substrate.

Example 110

Peel samples were prepared according to Example 101 except that the substrate used was glass prepared by cleaning with dichloroethane and that the topcoat used was the Premix (see Example 106). The sample exhibited good initial bonding. After 24 hr immersion in boiling water, the samples could be peeled from the substrate by hand.

It is apparent to those skilled in the art from the above description that various modifications can be made without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A composition comprising:
    (a) an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof; and
    (b) a salt former compound capable of forming a salt with the aromatic material;
    (c) a fluoroplastic or a perfluoroelastomer, wherein said perfluoroelastomer is substantially free of interpolymerized units of vinylidene fluoride;
    and optionally (d) a phase transfer catalyst.

2. The composition of claim 1 wherein the polyhydroxy aromatic resin comprises at least one aromatic ring having at least two hydroxyl groups attached directly to the aromatic ring.

3. The composition of claim 1 wherein the polyhydroxy aromatic compound comprises at least one aromatic ring having at least two hydroxyl groups attached directly to the aromatic ring.

4. The composition of claim 1 wherein element (a) comprises a catechol novolak resin, or a catechol cresol novolak resin.

5. The composition of claim 1 wherein the aromatic material or a material in which said aromatic material is dispersed has a melting temperature or softening point below the melting point or softening point of the fluoroplastic.

6. The composition of claim 5 wherein the aromatic material is provided on the surface of the fluoroplastic.

7. The composition of claim 1 wherein the salt former compound comprises an inorganic material.

8. The composition of claim 1 wherein element (a) is resorcinol, phloroglucinol, pyrogallol, catechol, hydroquinone, 1,5-dihydroxynaphthalene, 4,4-dihydroxybiphenyl, 4-hydroxythiophenol, or a combination thereof.

9. The composition of claim 1 wherein the salt former compound has a pKb less than about 6.

10. The composition of claim 1 wherein the salt former compound has a coating, optionally wherein the coating is selected from a wax.

11. The composition of claim 1 wherein the perfluoroelastomer or fluoroplastic has a coating comprising one or more of components (a), (b), and (d).

12. The composition of claim 1 wherein the fluoroplastic is selected from polytetrafluoroethylene, polyvinylidenefluoride, or a copolymer comprising interpolymerized units of tetrafluoroethylene with interpolymerized units of one or more fluorinated, partially fluorinated, or nonfluorinated comonomers.

13. The composition of claim 12 wherein the copolymer comprises comonomers selected from vinylidene fluoride, hexafluoropropylene, vinyl ethers, perfluorovinyl ethers, ethylene, propylene, chlorotrifluoroethylene, and combinations thereof.

14. The composition of claim 12 wherein the copolymer comprises interpolymerized units of tetrafluoroethylene, hexafluoropropylene, ethylene, and optionally, a perfluorovinyl ether.

15. The composition of claim 1 wherein the fluoroplastic is selected from THV, FEP, PFA, HTF, ETFE, ECTFE, PVDF, or a combination thereof.

16. An article comprising a coating, said coating comprising the composition of claim 1.

17. A composition comprising:
    a reaction product of (a) an aromatic material selected from a polythiol aromatic compound or resin, a hydroxythiophenol compound or resin, a catechol novolak resin, a catechol cresol novolak resin, a polyhydroxy aromatic resin or compound comprising at least one aromatic ring having at least one hydroxyl group attached directly to the aromatic ring, or a combination thereof; (b) a salt former compound capable of forming e salt with the aromatic material; and (c) a fluoroplastic or a perfluoroelastomer, wherein said perfluoroelastomer is substantially free of interpolymerized units or vinylidene fluoride; and optionally including (d) a phase transfer catalyst.

18. An article comprising a coating, said coating comprising the composition of claim 17.

19. A layered article comprising:
    (a) a substrate comprising a substantially organic material essentially free of a phenolate or thiolate salt, or a substantially inorganic material; and
    (b) a first layer comprising the composition of claim 17;
    wherein each of (i) the aromatic compound or resin and (ii) the salt former compound is, independently, present at an interface between the substrate and the remainder of the first layer, present with the fluoroplastic, or both; and
    wherein the first layer is bonded to the substrate.

20. The article of claim 19 wherein the substrate is selected from glass, fluoropolymer, nylon, ceramic, metal, iron, steel, stainless steel, aluminum, copper, nickel, and alloys and combination thereof.

21. The article of claim 19 wherein the substitute is the surface of fiber, flake, particle, which may be organic, inorganic, or a combination thereof.

22. The article of claim 19 further comprising a second layer adjacent to the first layer, the second layer comprising a fluoropolymer, and optionally a third layer adjacent to the second layer, the third layer optionally comprising a fluoropolymer.

23. The article of claim 22 wherein at least one of the second and/or third layer(s) comprises a mixture of two or more fluoropolymers.

24. The article of claim 19 wherein the fluoroplastic is selected from polytetrafluoroethylene, polyvinylidenefluoride, or a copolymer comprising interpolymerized units of tetrafluoroethylene with interpolymerized units of one or more fluorinated, partially fluorinated, or nonfluorinated comonomers.

25. The article of claim 24 wherein the copolymer comprises comonomers selected from vinylidene fluoride, hexafluoropropylene, vinyl ethers, perfluorovinyl ethers, ethylene, propylene, chlorotrifluoroethylene, and combinations thereof.

26. The article of claim 24 wherein the copolymer comprises interpolymerized units of tetrafluoroethylene, hexafluoropropylene, ethylene, and optionally, a perfluorovinyl ether.

27. The article of claim 17 wherein the fluoroplastic is selected from THV, FEP, PFA, HTE, ETFE, ECTFE, PVDF, or a combination thereof.

28. The article of claim 24 wherein the fluoropolymer to substrate interface has a peel strength in N/mm cm selected from at least about 0.7, at least about 0.8, and at least about 0.9.

29. The article of claim 24 wherein the fluoropolymer to substrate interface has a peel strength in N/mm selected from at least about 1.8, at least about 2.6, at least about 3.5, and at least about 4.3.

30. The article of claim 29 wherein said peel strength is measured after an exposure selected from room temperature aging for up to 24 hours, boiling water exposure for up to about 1 hour, boiling water exposure for up to about 5 hours, boiling water exposure for up to about 15 hours, and boiling water exposure for up to about 24 hours.

31. A method of providing a fluoropolymer for powder-coating comprising:
    providing the composition of claim 1, wherein the fluoroplastic or perfluoroelastomer is provided in granular or powder form; healing the composition to a temperature above the melting point of the aromatic material or providing the composition as a solution; and mixing the composition.

32. The method of claim 31 wherein the fluoroplastic is used and the healing is provided via high shear mixing.

33. The method of claim 32 wherein the aromatic material portion of the composition is provided in liquid form to the balance of the composition.

34. A method of providing a fluoropolymercoated surface comprising:
    (a) providing a substrate, optionally selected from a substantially inorganic material;
    applying to the substrate the composition of claim 1, wherein each of (i) the aromatic compound or resin and (ii) the salt former compound is, independently, present at an interface between the substrate and the remainder of the first layer, present with the fluoroplastic, or both; and (b) bonding the composition to the substrate.

35. The method of claim 34 further comprising bonding a second layer to the bonded composition, the second layer comprising a fluoropolymer.

36. The method of claim 34 wherein the composition of claim 1 is provided as the perfluoroelastomer or fluoroplastic having a coating, wherein said coating comprises one or more of components (a), (b), and (d).

37. The method of claim 34 wherein applying the composition to the substrate comprises electrostatic powder coating.

38. The method of claim 34 wherein bonding comprises fusing.

* * * * *

UNITED STATES PATENT AND TRADEMARK OFFICE
CERTIFICATE OF CORRECTION

PATENT NO.      : 6,911,512 B2
DATED           : June 28, 2005
INVENTOR(S)     : Jing, Naiyong It is certified that error appears in the above-identified patent and that said Letters Patent is hereby corrected as shown below:

Column 3,
Line 1, after "DESCRIPTION" insert -- OF --.
Line 31, delete "group" and insert -- groups --.

Column 5,
Line 15, after "fluorinated or" delete "30".

Column 7,
Line 13, after "thereof" insert -- . --.

Column 12,
Line 6, delete ""TL"means" and insert -- "TL" means --.

Column 17,
Line 35, delete "104" and insert -- 105 --.

Column 18,
Line 9, delete "hydroxidelmagnesium" and insert -- hydroxide/magnesium --.

Column 19,
Lines 7-8, delete "4,4-dihydroxybiphenyl" and insert -- 4,4'-dihydroxybiphenyl --.
Line 34, delete "HTF" and insert -- HTE --.
Line 47, delete "e" and insert -- a --.
Line 49, delete "or" and insert -- of --.

UNITED STATES PATENT AND TRADEMARK OFFICE
CERTIFICATE OF CORRECTION

PATENT NO.    : 6,911,512 B2
DATED         : June 28, 2005
INVENTOR(S)   : Jing, Naiyong It is certified that error appears in the above-identified patent and that said Letters Patent is hereby corrected as shown below:

Column 20,
Line 2, delete "combination" and insert -- combinations --.
Line 3, delete "substitute" and insert -- substrate --.
Line 4, after "of" insert -- a --.
Lines 49 and 54, delete "healing" and insert -- heating --.
Line 58, delete "fluoropolymercoated" and insert -- fluoropolymer-coated --.

Signed and Sealed this

First Day of November, 2005

JON W. DUDAS
*Director of the United States Patent and Trademark Office*